United States Patent
Lee et al.

(10) Patent No.: US 12,005,847 B2
(45) Date of Patent: Jun. 11, 2024

(54) VEHICLE FOR PROTECTING PASSENGER AND OPERATING METHOD THEREOF

(71) Applicants: HYUNDAI MOTOR COMPANY, Seoul (KR); Kia Corporation, Seoul (KR)

(72) Inventors: Sung Wook Lee, Seoul (KR); Sung Soo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 14 days.

(21) Appl. No.: 18/093,597

(22) Filed: Jan. 5, 2023

(65) Prior Publication Data
US 2023/0391283 A1    Dec. 7, 2023

(30) Foreign Application Priority Data
Jun. 2, 2022   (KR) .......................... 10-2022-0067547

(51) Int. Cl.
  *B60R 21/0132*    (2006.01)

(52) U.S. Cl.
  CPC .................. *B60R 21/0132* (2013.01); *B60R 2021/01322* (2013.01)

(58) Field of Classification Search
  CPC .................. B60R 21/0132; B60R 2021/01322
  See application file for complete search history.

*Primary Examiner* — Mathew Franklin Gordon
(74) *Attorney, Agent, or Firm* — MORGAN, LEWIS & BOCKIUS LLP

(57) ABSTRACT

A vehicle for protecting passengers of the vehicles includes a plurality of passenger protecting apparatuses; first sensors obtaining passenger information related to the passengers of the vehicle; second sensors obtaining vehicle motion information in a situation of a collision of the vehicle with another object; and a processor operatively connected to the passenger protecting apparatuses, the first sensors and the second sensors, and the processor estimates passenger behavior information in the situation of the collision based on the obtained passenger information and the obtained vehicle motion information; and controls operation of at least one of the plurality of passenger protecting apparatuses based on the estimated passenger behavior information; and the passenger information may include at least one of state information on a seat of the passenger and information on whether the passenger is wearing a belt.

20 Claims, 7 Drawing Sheets

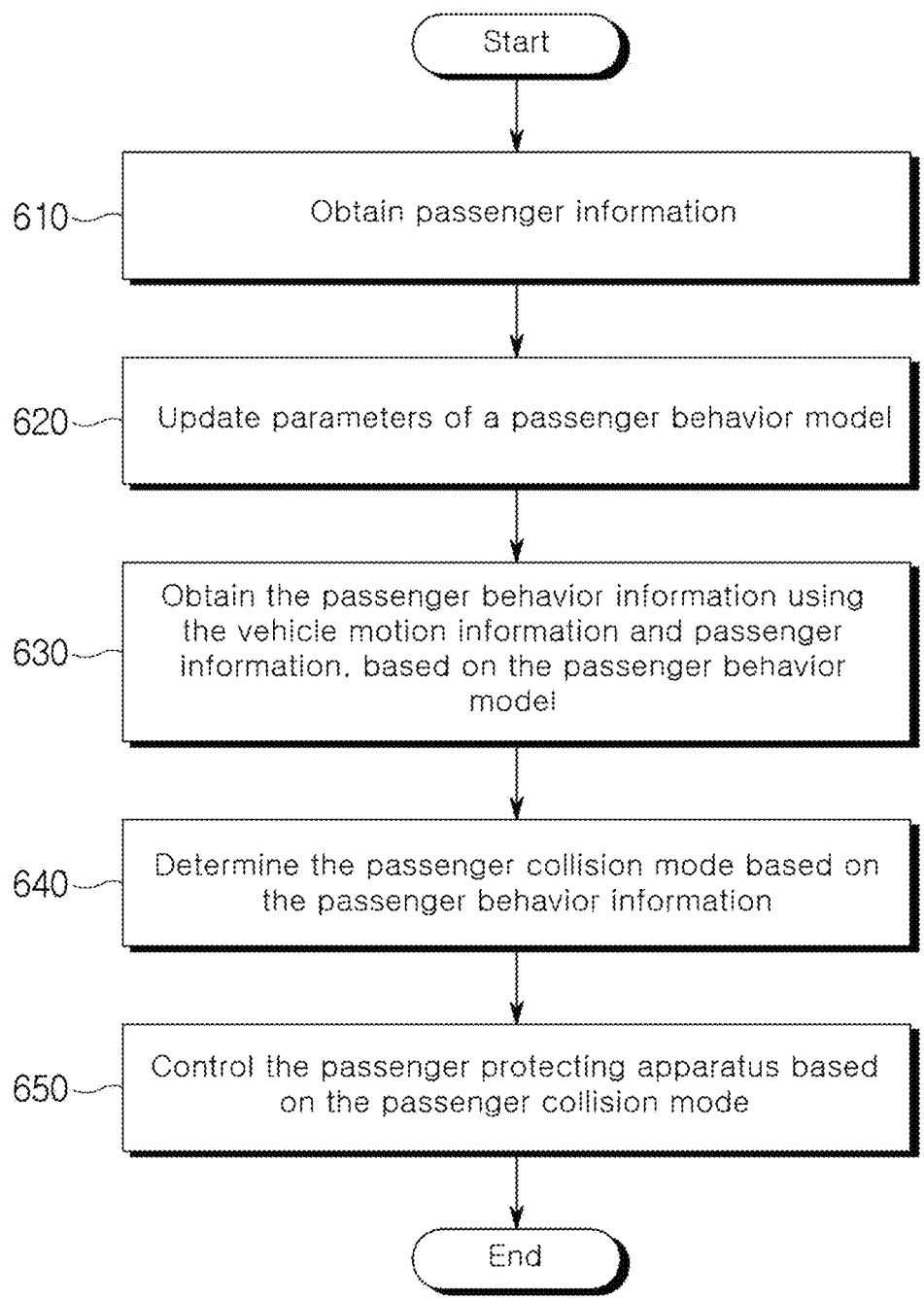

VEHICLE FOR PROTECTING PASSENGER AND OPERATING METHOD THEREOF

CROSS REFERENCE TO RELATED APPLICATION

The present application claims priority to Korean Patent Application No. 10-2022-0067547, filed Jun. 2, 2022, the entire contents of which is incorporated herein for all purposes by this reference.

BACKGROUND OF THE PRESENT DISCLOSURE

Field of the Present Disclosure

The present disclosure relates to a passenger protecting apparatus in a vehicle and the operating method thereof.

Description of Related Art

Recently, advanced driver assistance systems (ADAS) are being developed to assist driving of a driver. The ADAS has multiple sub-technology categories and provides convenience to a driver. Such ADAS is also called autonomous driving or ADS (Automated Driving System).

While the vehicle is autonomously driving through ADS, passengers may engage in activities other than driving. Accordingly, the seat in the vehicle supporting autonomous driving may be rotatably provided so that the passenger can comfortably carry out other activities. For example, the driver's seat of a vehicle supporting autonomous driving may be rotated to face the rear or the side of the vehicle rather than the front.

On the other hand, the vehicle is provided with a passenger protecting apparatus (or safety apparatus), and operates the passenger protecting apparatus when a collision occurs. For example, a conventional vehicle evaluates a collision severity using values obtained from an acceleration and/or angular velocity sensor, and operates a passenger protecting apparatus such as an airbag when the collision severity is higher than a threshold value.

As seats in a vehicle is freely rotatable, the actual injury of a passenger in the event of an accident caused by a collision may depend on the behavior of the passenger in the event of the collision, in addition to the collision intensity and the collision direction. A passenger's behavior due to a collision may vary depending on a state of a seat and whether a passenger is wearing a belt or not. However, because the conventional operation method of the passenger protecting apparatus does not consider a seat condition and whether a passenger is wearing a belt or not, a situation in which the passenger cannot be protected may occur.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus of controlling a passenger protecting apparatus by estimating a behavior of an indoor passenger in a collision situation in a vehicle.

Various embodiments of the present disclosure provide a method and apparatus of estimating a passenger collision mode according to a behavior of a passenger in a collision situation based on state information on a passenger seat and information on a belt in a vehicle.

Technical problems aimed to solve in the present disclosure are not limited to what are mentioned above, and other technical problems not mentioned above may be precisely understood by those skilled in the art from the description provided below.

According to various embodiments of the present disclosure, an exemplary embodiment of the present disclosure is a vehicle for protecting passengers of the vehicles including: a plurality of passenger protecting apparatuses; first sensors obtaining passenger information related to the passengers of the vehicle; second sensors obtaining vehicle motion information in a situation of a collision of the vehicle with another object; and a processor operatively connected to the passenger protecting apparatuses, the first sensors and the second sensors, and the processor is configured to estimate passenger behavior information in the situation of the collision based on the obtained passenger information and the obtained vehicle motion information; and is configured to control operation of at least one of the plurality of passenger protecting apparatuses based on the estimated passenger behavior information; and the passenger information may include at least one of state information on a seat of the passenger and information on whether the passenger is wearing a belt.

According to the exemplary embodiment of the present disclosure, the state information on the seat of the passenger may include at least one of a recline angle of the seat, a swivel angle of the seat, a sliding position of the seat, a longitudinal distance between the seat and a dashboard, a lateral distance between the seat and another seat, and a lateral distance between the seat and a door of the vehicle.

According to the exemplary embodiment of the present disclosure, the vehicle motion information may include at least one of a yaw rate, a pitch rate, and a roll rate and acceleration applied to the vehicle in the situation of the collision.

According to the exemplary embodiment of the present disclosure, the processor updates a passenger parameter of a passenger behavior model based on the passenger information; estimates the passenger behavior information in the situation of the collision by inputting the passenger information and the vehicle motion information into the passenger behavior model of which the passenger parameter is updated; and the passenger parameter may include at least one of a pitch rotational motion coefficient of a specified mass point, a roll rotation coefficient of the specified mass point, and a linear motion coefficient of the specified mass point.

According to the exemplary embodiment of the present disclosure, the specified mass point may include at least one of a head, a chest, and a lower body of the passenger.

According to the exemplary embodiment of the present disclosure, the passenger behavior information includes at least one of state information on a rotational motion of the specified mass point, and state information on a linear motion of the specified mass point, and the state information on the rotational motion includes at least one of a pitch angle, a pitch rate, a roll angle, and a roll rate of the specified mass point, and the state information on the linear motion may include a movement amount of the specified mass point.

According to the exemplary embodiment of the present disclosure, the processor is configured to determine a passenger collision mode based on the passenger behavior information; determines at least one passenger protecting apparatus to operate among the plurality of passenger protecting apparatuses based on the determined passenger collision mode; and is configured to control the determined at least one passenger protecting apparatus to operate; and the passenger collision mode may include at least one of a roll behavior exaggeration mode, a pitch behavior exaggeration mode, and a submarine mode.

According to the exemplary embodiment of the present disclosure, the processor is configured to determine the roll behavior exaggeration mode as the passenger collision mode, when at least one of the roll angle and the roll rate of the specified mass point is greater than a predetermined roll threshold, and may determine the pitch behavior exaggeration mode as the passenger collision mode, when at least one of the pitch angle and the pitch rate of the specified mass point is greater than a predetermined pitch threshold, and may determine the submarine mode as the passenger collision mode, when the movement amount of the specified mass point is greater than a predetermined threshold.

According to the exemplary embodiment of the present disclosure, the passenger parameter may be updated based on a lookup table representing standard male and female rotational motion coefficients per seat condition.

According to the exemplary embodiment of the present disclosure, the processor may check at least one rotational motion coefficient corresponding to the state information on the seat of the passenger in the lookup table, and may obtain a passenger parameter updated by applying a correction coefficient according to whether the passenger is wearing a belt to the at least one rotational motion coefficient.

According to various embodiments of the present disclosure, another exemplary embodiment of the present disclosure is a method for operating a vehicle for protecting passengers of the vehicles including: obtaining passenger information related to the passengers in the vehicle; obtaining vehicle motion information in a situation of a collision of the vehicle with another object; estimating passenger behavior information in the situation of the collision based on the obtained passenger information and the obtained vehicle motion information; and controlling operation of at least one of the plurality of passenger protecting apparatuses provided in the vehicle based on the estimated passenger behavior information, and the passenger information may include at least one of state information on a seat of the passenger and information on whether the passenger is wearing a belt.

According to the exemplary embodiment of the present disclosure, the state information on the seat of the passenger included in the passenger information may include at least one of a recline angle of the seat, a swivel angle of the seat, a sliding position of the seat, a longitudinal distance between the seat and a dashboard, a lateral distance between the seat and another seat, and ae lateral distance between the seat and a door of the vehicle.

According to the exemplary embodiment of the present disclosure, the vehicle motion information in the situation of the collision may include at least one of a yaw rate, a pitch rate, and a roll rate and acceleration applied to the vehicle in the situation of the collision.

According to the exemplary embodiment of the present disclosure, the estimating passenger behavior information may include updating a passenger parameter of a passenger behavior model based on the passenger information; estimating a passenger behavior information in the situation of the collision by inputting the passenger information and the vehicle motion information into the passenger behavior model of which the passenger parameter is updated, and the passenger parameter may include at least one of a pitch rotational motion coefficient of a specified mass point, a roll rotation coefficient of the specified mass point, and a linear motion coefficient of the specified mass point.

According to the exemplary embodiment of the present disclosure, the estimated passenger behavior information may include at least one of state information on a rotational motion of the specified mass point, and state information on a linear motion of the specified mass point, and the state information on the rotational motion may include at least one of a pitch angle, a pitch rate, a roll angle, and a roll rate of the specified mass point, and the state information on the linear motion may include a movement amount of the specified mass point.

According to the exemplary embodiment of the present disclosure, the controlling operation of the at least one of the plurality of passenger protecting apparatuses may include: determining a passenger collision mode based on the passenger behavior information; determining at least one passenger protecting apparatus to operate among the plurality of passenger protecting apparatuses based on the determined passenger collision mode; and controlling the determined at least one passenger protecting apparatus to operate, and the passenger collision mode may include at least one of a roll behavior exaggeration mode, a pitch behavior exaggeration mode, and a submarine mode.

According to the exemplary embodiment of the present disclosure, the determining the passenger collision mode may include: determining the roll behavior exaggeration mode as the passenger collision mode when at least one of a roll angle or a roll rate of the specified mass point is greater than a predetermined roll threshold; determining the pitch behavior exaggeration mode as the passenger collision mode when at least one of a pitch angle or a pitch rate of the specified mass point is greater than a predetermined pitch threshold; and determining the submarine mode as the passenger collision mode when a movement amount of the specified mass point is greater than a predetermined movement amount threshold.

According to the exemplary embodiment of the present disclosure, the passenger parameter may be updated based on a lookup table representing standard male and female rotational motion coefficients per seat condition.

According to the exemplary embodiment of the present disclosure, the updating the passenger parameter of the passenger behavior model may include: checking at least one rotational motion coefficient corresponding to state information on the seat of the passenger in the lookup table, and obtaining a passenger parameter updated by applying a correction coefficient according to whether the passenger is wearing a belt to the at least one rotational motion coefficient.

Advantageous Effects

According to various embodiments of the present disclosure, the vehicle may enhance performance of protecting the passenger by estimating a passenger collision mode according to the behavior of a passenger in a situation of a collision and controlling the passenger protecting apparatus based on the passenger collision mode.

The methods and apparatuses of the present disclosure have other features and advantages which will be apparent

BRIEF DESCRIPTION OF THE DRAWINGS

FIG. 6 is a flowchart for controlling a passenger protecting apparatus in a vehicle by estimating passenger behavior information according to various embodiments of the exemplary embodiment of the present disclosure.

Figure 1:
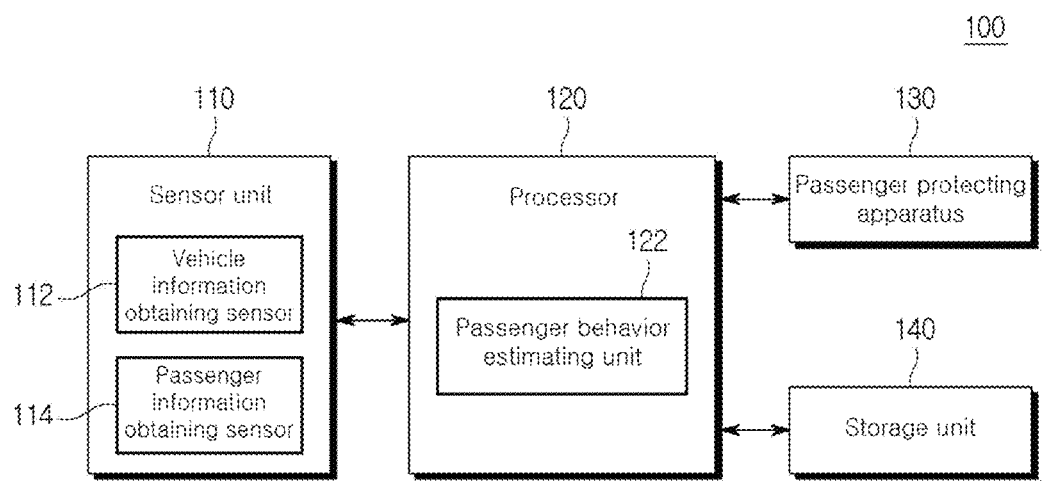
FIG. 1 is a block diagram of a vehicle according to various embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to accompanying drawings, while regardless of reference symbols of the accompanying drawings, components the same as or similar to the abovementioned embodiments are denoted by the same reference numerals and their description which is redundant is omitted.

As used herein, the suffixes 'module' and 'part' are often used for elements in consideration of convenience in writing out the present disclosure and may be used together or interchangeably, and the terms do not have any distinguishable meaning or role by themselves. Furthermore, the terms, 'module' or 'part', may mean software components or hardware components such as a field programmable gate array (FPGA), an application specific integrated circuit (ASIC). The 'part' or 'module' performs certain functions. However, the 'part' or 'module' is not meant to be limited to software or hardware. The 'part' or 'module' may be configured to be placed in an addressable storage medium or to restore one or more processors. Thus, for one example, the 'part' or 'module' may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the 'part' or 'module' may be combined with a smaller number of components and 'parts' or 'modules' or may be further divided into additional components and 'parts' or 'modules'.

Methods or algorithm steps described relative to various exemplary embodiments of the present disclosure may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC). The ASIC may be resident within a user's terminal.

Furthermore, in describing an exemplary embodiment of the present disclosure, if a description of a related known art in detail is deemed to unnecessarily obscure the substance of the present disclosure, description of such art will be omitted. Also, it may be understood that the accompanying drawings are used for convenience of explaining the disclosed exemplary embodiments of the present disclosure, and the technical concept of the present disclosure are not limited by the accompanying drawings, and that the accompanying drawings include all the modifications, equivalents or replacements thereof included in the spirit and technical scope of the present disclosure.

While terms such as the first and the second, etc., may be used to describe various components, the components are not limited by the terms mentioned above. The terms are used only for distinguishing between one component and other components.

What one component is referred to as being 'connected to' or 'accessed to' another component includes both a case where one component is directly connected or accessed to another component and a case where a further another component is located between them. Meanwhile, what one component is referred to as being 'directly connected to' or 'directly accessed to' another component indicates that a further another component is not located between them.

Hereinafter, in the present disclosure, a vehicle may be the one which is provided with Automated Driving System (ADS) and is configured for autonomous driving. For example, the vehicle may perform at least one of steering, acceleration, deceleration, lane change, and stopping by the ADS, without a driver's manipulation. For example, the ADS may include at least one of, for example, Pedestrian Detection and Collision Mitigation System (PDCMS), Lane Change Decision Aid System (LCDAS), Land Departure Warning System (LDWS), Adaptive Cruise Control (ACC), Lane Keeping Assistance System (LKAS), Road Boundary Departure Prevention System (RBDPS), Curve Speed Warning System (CSWS), Forward Vehicle Collision Warning System (FVCWS), and Low Speed Following (LSF).

FIG. 1 is a block diagram of a vehicle according to various embodiments of the present disclosure.

Figure 2:
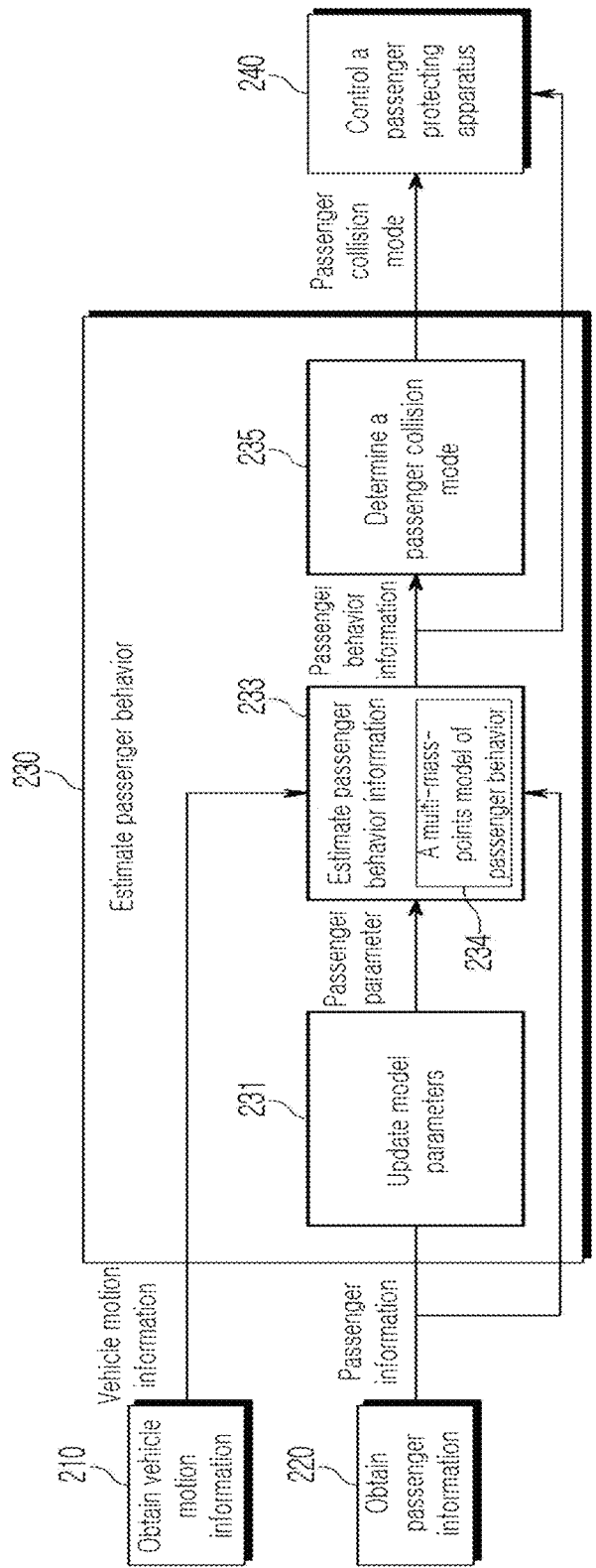
FIG. 2 is a diagram illustrating an example of estimating a passenger behavior in a vehicle according to various embodiments of the present disclosure.
Figure 3A:
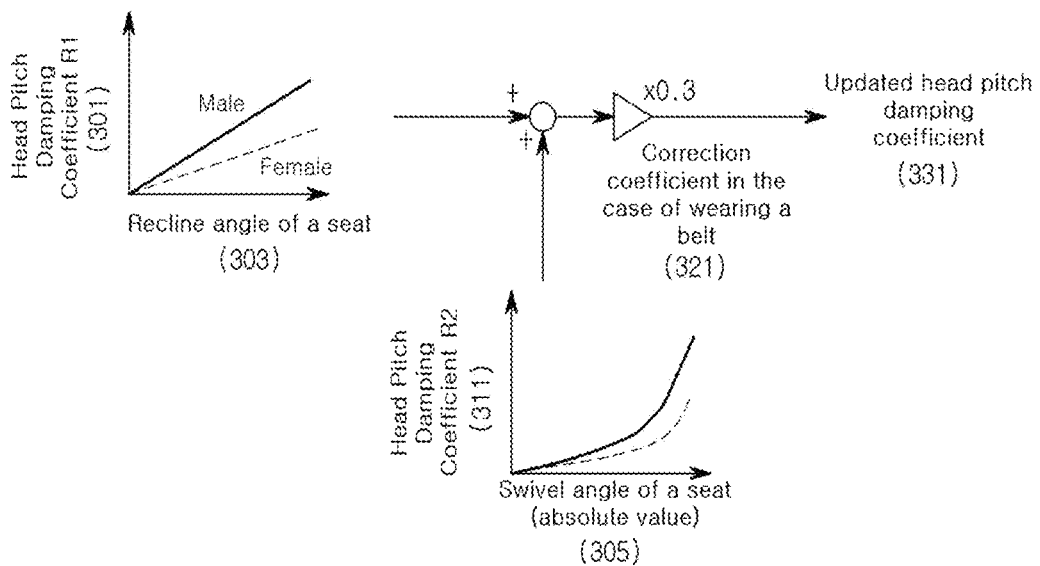
FIG. 3A and FIG. 3B are illustrations showing an example of updating parameters of a passenger behavior model in a vehicle according to various embodiments of the present disclosure.
Figure 3B:
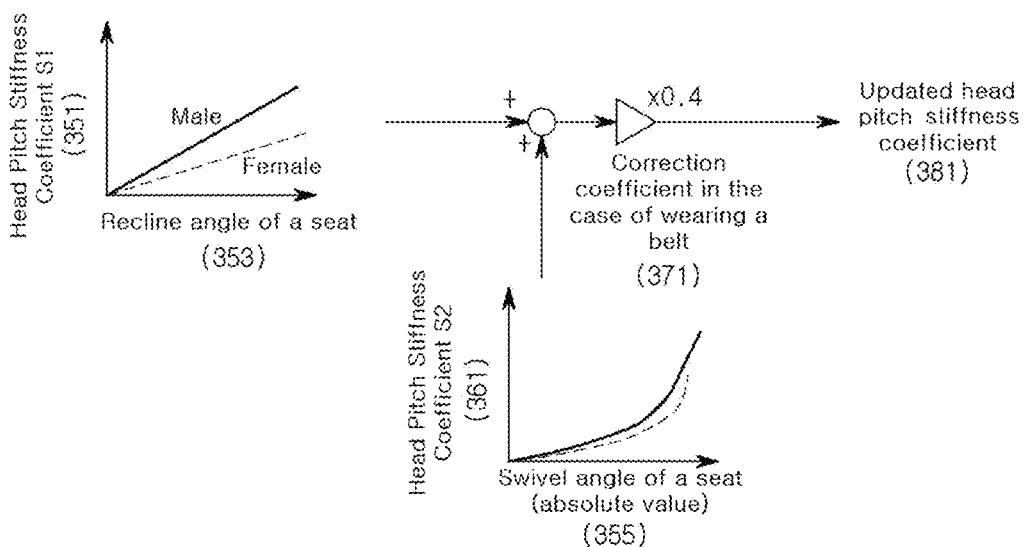
Figure 4:
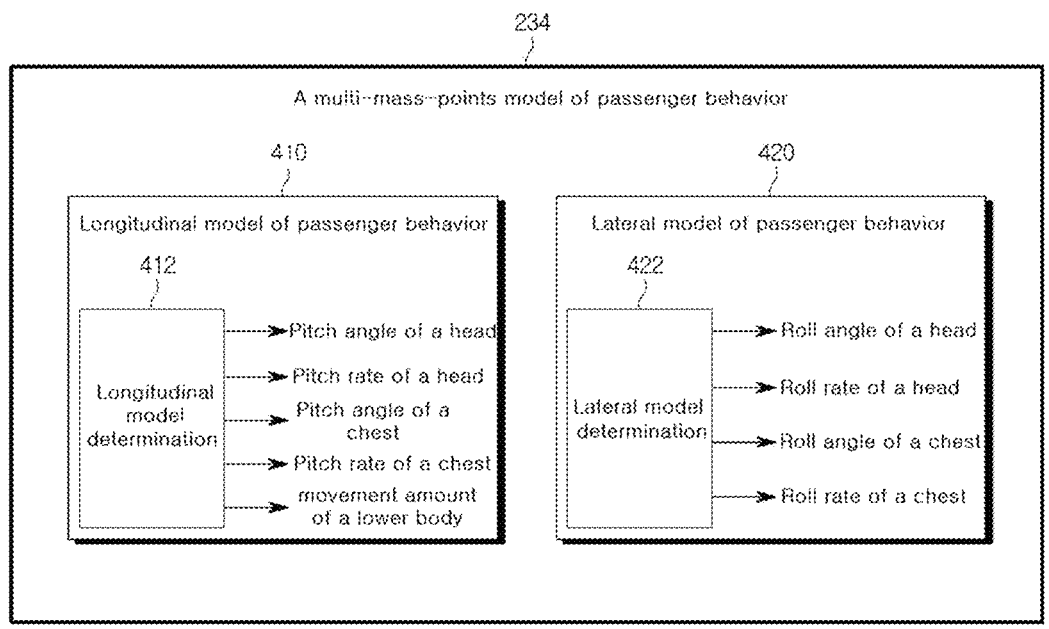
FIG. 4 is a block diagram illustrating a multi-mass-points model of a passenger behavior in a vehicle according to various embodiments of the present disclosure.
Figure 5A:
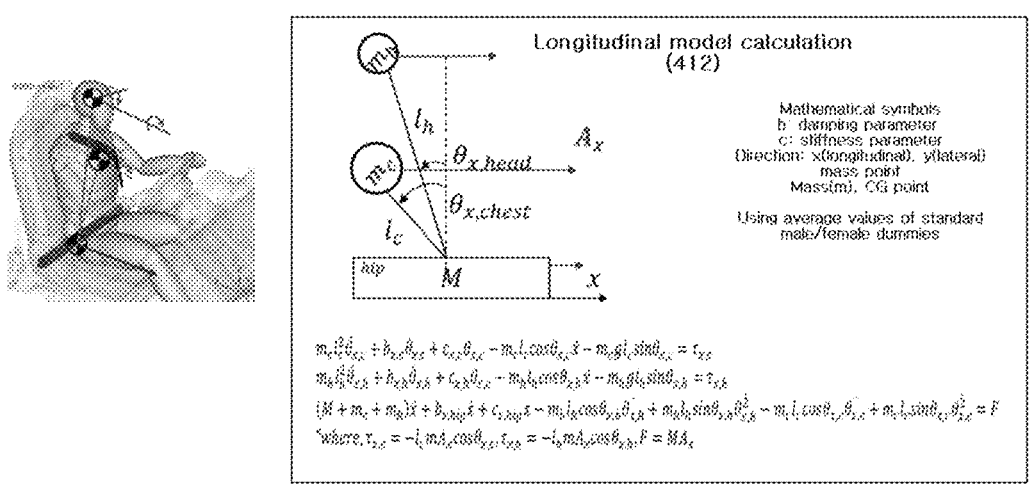
FIG. 5A is an illustration showing an example of a longitudinal model determination to estimate passenger behavior information according to various embodiments of the exemplary embodiment of the present disclosure.
Figure 5B:
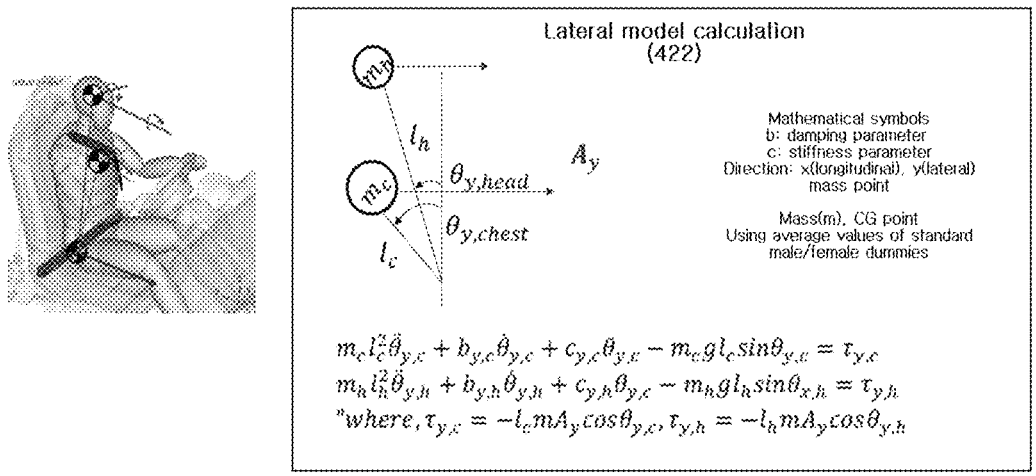
FIG. 5B is an illustration showing an example of a lateral model determination to estimate passenger behavior information according to various embodiments of the exemplary embodiment of the present disclosure.
Figure 5C:
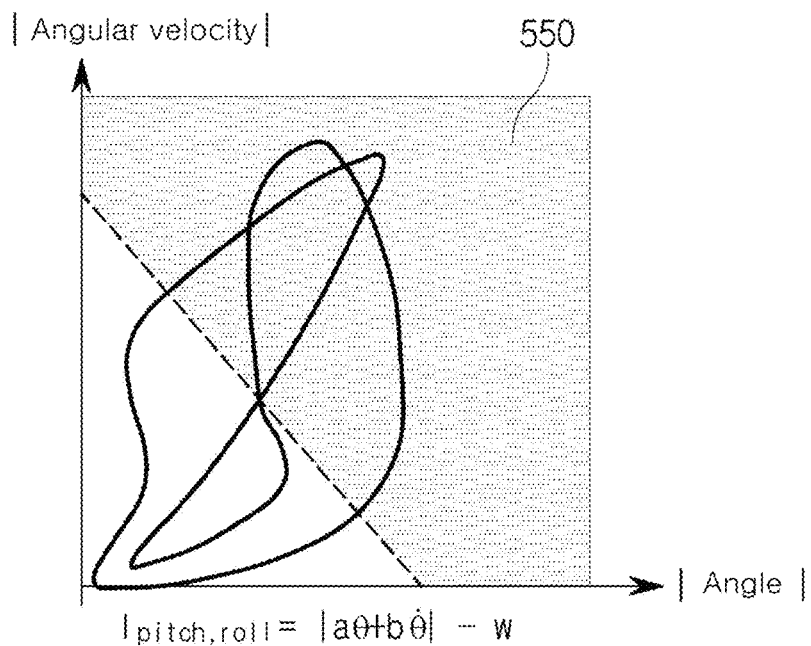
FIG. 5C is an illustration showing an example of determining a passenger collision mode according to various embodiments of the exemplary embodiment of the present disclosure.

The configuration of the vehicle shown in FIG. 1 is an exemplary embodiment of the present disclosure, and each component may be configured as one chip, one component, or one electronic circuit, or a combination of chips, components and/or electronic circuits. According to an exemplary embodiment of the present disclosure, some of the components shown in FIG. 1 may be divided into a plurality of components and configured as different chips, different components, or different electronic circuits, and some components may be combined to form one chip, one component, or one electronic circuit. According to the exemplary embodiment of the present disclosure, some of the components shown in FIG. 1 may be omitted or other components not shown may be added. Among the components of FIG. 1, at least some of the components thereof will be described with reference to FIG. 2, FIG. 3, FIG. 4 and FIG. 5C. FIG. 2 is a diagram illustrating an example of estimating a passenger behavior in a vehicle according to various embodiments of the present disclosure, FIG. 3A and FIG. 3B are illustrations showing an example of updating parameters of a passenger behavior model in a vehicle according to various embodiments of the present disclosure. FIG. 4 is a block diagram illustrating a multi-mass-points model of a passenger behavior in a vehicle according to various embodiments of the present disclosure. FIG. 5A is an illustration showing an example of a longitudinal model determination to estimate passenger behavior information according to various embodiments of the exemplary embodiment of the present disclosure. FIG. 5B is an illustration showing an example of a lateral model determination to estimate passenger behavior information according to various embodiments of the exemplary embodiment of the present disclosure. FIG. 5C is an illustration showing an example of determining a passenger collision mode according to various embodiments of the exemplary embodiment of the present disclosure.

Referring to FIG. 1, a vehicle 100 may include a sensor unit 110, a processor 120, a passenger protecting apparatus 130, and a storage unit 140.

According to various exemplary embodiments of the present disclosure, the sensor unit 110 may generate data related to a state of a vehicle, a vehicle interior, and/or an external environment of a vehicle using a plurality of sensors. According to the exemplary embodiment of the present disclosure, the sensor unit 110 may include a vehicle information obtaining sensor 112 and a passenger information obtaining sensor 114.

The vehicle information obtaining sensor 112 may detect a collision between a vehicle and an object (e.g., another vehicle, a pedestrian, an obstacle, and the like) and generate a collision detection signal. The vehicle information obtaining sensor 112 includes at least one sensor, and may obtain information on collision direction, collision intensity, and information on vehicle motion at an initial stage (or situation) of the collision. For example, the vehicle information obtaining sensor 112 may include at least one of a Low-G sensor which measures gravitational acceleration provided to the vehicle, a front impact sensor (FIS) which is provided in the front surface of the vehicle and detects acceleration due to a collision, a side impact sensor (SIS) which is provided on a side of the vehicle and detects acceleration due to a collision, and an angular velocity sensor which detects yaw, roll and pitch. The vehicle motion information may include at least one of a gravitational acceleration obtained from the Low-G sensor, acceleration obtained from the front impact sensor, acceleration obtained from the side impact sensor, and a yaw rate, roll rate, and pitch rate obtained from the angular velocity sensor. Because vehicle motion information is information obtained from sensors at the initial stage of a collision, it may be referred to as collision sensor information.

The passenger information obtaining sensor 114 may obtain passenger information including state information on a seat where a passenger is accommodated in the vehicle and constraint information on the passenger. The state information on the seat on which the passenger is accommodated may indicate the posture and/or position of the passenger, and the constraint information on the passenger may indicate whether the passenger is constrained by the seat. For example, the state information on a seat includes at least one of a recline angle of a seat (or the tilt of the seat), a swivel angle of a seat (or the rotational state of the seat), a sliding position of a seat (position of the seat), a lateral distance between a seat and a dashboard, a lateral distance between a seat and another seat, and a lateral distance between a seat and a door. The recline angle of a seat may indicate, for example, an angle of a backrest of a seat. The swivel angle of a seat may indicate how much a seat is rotated in a left or right direction based on a time when the seat faces the front of the vehicle. The sliding position of a seat may indicate how much the seat has moved forward or backward from a predetermined reference position. The predetermined reference position may be set and/or changed by a designer. The predetermined reference position may be, for example, a position of a steering wheel, a position of a dashboard, or a basic position of a corresponding seat, but is not limited thereto. The constraint information on the passenger may include information on whether a passenger is wearing a belt or not.

The sensor unit 110 may additionally include at least one sensor other than the above-described sensors. For example, the sensor unit 110 may further include at least one of a camera that captures an environment outside a vehicle, a radio detection and ranging (RADAR), a light detection and ranging (LIDAR) that detects an object around a vehicle, or a location measurement sensor configured for measuring which is configured to measure a location of a vehicle. The listed sensors are only examples for helping understanding, and the sensors of the present specification are not limited thereto.

The processor 120 may control the overall operation of the vehicle 100. According to the exemplary embodiment of the present disclosure, the processor 120 may include an electrical control unit (ECU) configured for integrally controlling components in the vehicle 100. For example, the processor 120 may include a central processing unit (CPU) or micro processing unit (MCU) configured for performing arithmetic processing.

According to various exemplary embodiments of the present disclosure, the processor 120 may estimate passenger behavior information in a collision situation based on passenger information and vehicle motion information obtained from the sensor unit 110, and may control operation of the passenger protecting apparatus 130 based on the estimated passenger behavior information. According to the exemplary embodiment of the present disclosure, as shown in FIG. 2, a passenger behavior estimating unit 122 of the processor 120 may estimate passenger behavior information in a collision situation using the multi-mass-points model of the passenger behavior 234, and may control the passenger protecting apparatus 240 based on the estimated passenger behavior information.

The passenger behavior estimating unit 122 may obtain vehicle motion information 210 from the vehicle information obtaining sensor 112, and obtain passenger information 220 from the passenger information obtaining sensor 114.

The passenger behavior estimating unit 122 may estimate passenger behavior 230 based on the vehicle motion information and the passenger information. The passenger behavior estimating unit 122 may update model parameters 231 used for passenger behavior estimation based on the passenger information. For example, the passenger behavior estimating unit 122 may update passenger parameters of the multi-mass-points model of the passenger behavior 234. The passenger parameters of the multi-mass-points model of the passenger behavior 234 may include a rotational motion coefficient and/or a linear motion coefficient for a specified mass point among a plurality of mass points in a passenger's body part. In an example of the present disclosure, the specified mass points may include a head, a chest, and a lower body (or buttocks). For example, the passenger parameters may include at least one of a rotational motion coefficient of a pitch and/or roll of a head and/or chest, and a linear motion coefficient of a lower body. According to the exemplary embodiment of the present disclosure, the passenger parameters may include one among a head pitch damping coefficient, head pitch stiffness coefficient, head roll damping coefficient, head roll stiffness coefficient, chest pitch damping coefficient, chest pitch stiffness coefficient, chest roll damping coefficient, chest roll stiffness coefficient, hip linear-damping coefficient, and a hip linear-stiffness coefficient.

According to the exemplary embodiment of the present disclosure, passenger parameters may be updated using the model parameter lookup table obtained and evaluated in advance through a SLED test and a model parameter determination formula based on the lookup table. For example, the model parameter lookup table may represent standard male and female rotational motion coefficients per seat condition. The model parameter lookup table may be formed as a graph representing the standard male and female rotational motion coefficients per seat condition. Here, the seat condition may include at least one of a recline angle of a seat, a seat swivel angle, and a seat sliding position.

As illustrated in FIG. 3A and FIG. 3B, the passenger behavior estimating unit 122 may update a head pitch rotational motion coefficient. For example, the passenger behavior estimating unit 122 may check a recline angle of a seat included in the current passenger information and a head pitch damping coefficient R1 corresponding to gender of a passenger in a graph or a lookup table representing a head pitch damping coefficient of standard male and female R1 301 per recline angle of a seat 303. The passenger behavior estimating unit 122 may check a swivel angle of a seat included in the current passenger information and a head pitch damping coefficient R2 corresponding to gender of a passenger in a graph or a lookup table representing a head pitch damping coefficient R2 311 of standard male and female per seat swivel angle 305. The passenger behavior estimating unit 122 may obtain an updated head pitch damping coefficient 311, by adding the confirmed R1 and R2 and applying a correction coefficient according to whether a passenger is wearing a belt 321 (e.g., about 0.3) thereto. Here, the correction coefficient of 0.3 may be a value being applied when the belt is not worn. For example, the correction coefficient in the case of wearing a belt may be 1. Such a correction coefficient is only an example, and various embodiments of the present disclosure are not limited thereto.

As an exemplary embodiment of the present disclosure, the passenger behavior estimating unit 122 may check a recline angle of a seat included in the current passenger information and a head pitch stiffness coefficient S1 corresponding to gender of a passenger in a graph or a lookup table representing a head pitch stiffness coefficient S1 351 of standard male and female per recline angle of a seat 353. The passenger behavior estimating unit 122 may check a swivel angle of a seat included in the current passenger information and a head pitch stiffness coefficient S2 corresponding to gender of a passenger in a graph or a lookup table representing a head pitch stiffness coefficient S2 361 of standard male and female per swivel angle of a seat 355. The passenger behavior estimating unit 122 may obtain an updated head pitch stiffness coefficient 381, by adding the confirmed R1 and R2 and applying a correction coefficient according to whether a passenger is wearing a belt 371 (e.g., about 0.4) thereto.

The passenger behavior estimating unit 122 may update other model parameters using the determination formulas for an individual model parameter obtained in advance through the sled test in a method shown in FIG. 3A and FIG. 3B.

For example, the passenger behavior estimating unit 122 may check a recline angle of a seat included in the current passenger information and a head roll damping coefficient R'1 corresponding to gender of a passenger in a graph or a lookup table representing a head roll damping coefficient R'1 of standard male and female per recline angle of a seat. The passenger behavior estimating unit 122 may check a swivel angle of a seat included in the current passenger information and a head roll damping coefficient R'2 corresponding to gender of a passenger in a graph or a lookup table representing a head roll damping coefficient R'2 of standard male and female per swivel angle of a seat. The passenger behavior estimating unit 122 may obtain an updated head roll damping coefficient, by adding the confirmed R'1 and R'2 and applying a correction coefficient according to whether a passenger is wearing a belt thereto.

As an exemplary embodiment of the present disclosure, the passenger behavior estimating unit 122 may check a recline angle of a seat included in the current passenger information and a chest roll stiffness coefficient S1 corresponding to gender of a passenger in a graph or a lookup table representing a chest roll stiffness coefficient S1' of standard male and female per recline angle of a seat. The passenger behavior estimating unit 122 may check a swivel angle of a seat included in the current passenger information and a chest roll stiffness coefficient S'2 corresponding to gender of a passenger in a graph or a lookup table representing a chest roll stiffness coefficient S'2 of standard male and female per swivel angle of a seat. The passenger behavior estimating unit 122 may obtain an updated chest roll stiffness coefficient, by adding the confirmed S1' and S'2 and applying a correction coefficient according to whether a passenger is wearing a belt thereto.

As explained above, the passenger behavior estimating unit 122 may update a head roll damping coefficient, head roll stiffness coefficient, chest pitch damping coefficient, chest pitch stiffness coefficient, chest roll damping coefficient, chest roll stiffness coefficient, hip linear-damping coefficient, and a hip linear-stiffness coefficient in the same method shown in FIG. 3A and FIG. 3B.

The passenger behavior estimating unit 122 may estimate passenger behavior information 233 by inputting passenger information and vehicle motion information to a multi-mass-points model of the passenger behavior 234 and using a multi-mass-points model of the passenger behavior 234. The passenger behavior information may include state information on rotational motion and/or linear motion of the specified mass points (e.g., head, chest, lower body) among a plurality of mass points in a passenger's body part. For example, the passenger behavior information may include at least one of a pitch angle of a head, roll angle of a head, pitch rate of a head, roll rate of a head, pitch angle of a chest, roll angle of a chest, pitch rate of a chest, roll rate of a chest, and a movement amount of a lower body in a longitudinal direction thereof.

According to the exemplary embodiment of the present disclosure, the multi-mass-points model of the passenger behavior 234 may include a longitudinal model of passenger behavior 410 and a lateral model of passenger behavior 420, as illustrated in FIG. 4. The longitudinal model of passenger behavior 410 may output at least one of a pitch angle of a head, a pitch rate of a head, a pitch angle of a chest, a pitch rate of a chest, and a movement amount of a lower body, through a longitudinal model determination. The longitudinal model determination 412 may be configured, for example, to be the same as FIG. 5B. For example, the longitudinal model of passenger behavior 410 may output at least one of a pitch angle of a head, pitch rate of a head, pitch angle of a chest, pitch rate of a chest, and a movement amount of a lower body, through the longitudinal model determination 412 using at least one of a chest pitch damping coefficient ($b_{x,c}$), chest pitch stiffness coefficient ($c_{x,c}$), head pitch damping coefficient ($b_{x,h}$), head pitch stiffness coefficient ($c_{x,h}$), hip linear-damping coefficient ($b_{x,hip}$), and a hip linear-stiffness coefficient ($c_{x,hip}$) as input variables.

A lateral model of passenger behavior 420 may output at least one of a roll angle of a head, a roll rate of a head, a roll angle of a chest, and a roll rate of a chest, through a lateral model determination 422. The lateral model determination 422 may be configured, for example, to be the same as FIG. 5B. For example, the lateral model of passenger behavior 420 may output at least one of a roll angle of a head, a roll rate of a head, a roll angle of a chest, and a roll rate of a chest, through the lateral model determination 422 using at least one of a head roll damping coefficient ($b_{y,h}$), a head roll stiffness coefficient ($c_{y,h}$), a chest roll damping coefficient ($b_{y,c}$) and a chest roll stiffness coefficient ($c_{y,c}$) as input variables.

The passenger behavior estimating unit 122 may determine a passenger collision mode 235 based on passenger behavior information. The passenger collision mode may include at least one of a pitch behavior exaggeration mode, a roll behavior exaggeration mode, and a submarine mode. When a pitch angle and/or a pitch rate of a head and/or a chest is greater than a pitch threshold in the passenger behavior information, the passenger behavior estimating unit 122 may determine the pitch behavior exaggeration mode as the passenger collision mode. When a roll angle and/or roll rate of a head and/or a chest is greater than a roll threshold in the passenger behavior information, the passenger behavior estimating unit 122 may determine a roll behavior exaggeration mode as a passenger collision mode. For example, as illustrated in FIG. 5C, when a pitch rate and/or roll rate according to a pitch angle and/or roll angle of a head and/or a chest corresponds to a first region 550, the passenger behavior estimating unit 122 may determine a pitch and/or roll exaggeration mode.

The passenger behavior estimating unit 122 may determine the submarine mode as the passenger collision mode, when the movement amount of a lower body in a longitudinal direction is greater than a threshold of a movement amount in the passenger behavior information.

The passenger behavior estimating unit 122 may control a passenger protecting apparatus 240 based on at least one of the passenger behavior information and the passenger collision mode. According to the exemplary embodiment of the present disclosure, the passenger behavior estimating unit 122 may determine at least one passenger protecting apparatus to operate according to the passenger collision mode, and operate the at least one determined passenger protecting apparatus. The passenger protecting apparatus may include, for example, at least one of an airbag and a PSB (pre safe seat belt). The above is merely an example, and the passenger protecting apparatus according to various embodiment of the present disclosure is not limited to an airbag and a PSB. For example, the passenger behavior information and/or the passenger collision mode may be used for operating and/or controlling other apparatus provided in the vehicle.

The passenger protecting apparatus 130 may include apparatuses for protecting a passenger. For example, the passenger protecting apparatus 130 may include a plurality of airbags and/or a plurality of PSB.

The storage unit 140 may store various programs and data for operation of the vehicle and/or processor 120. According to the exemplary embodiment of the present disclosure, the storage unit 140 may store various programs and data necessary to determine and operate the passenger protecting apparatus according to the passenger behavior information and/or passenger collision mode. For example, the storage unit 140 may store information with regard to combination of the passenger protecting apparatuses corresponding to the passenger behavior information and/or passenger collision mode.

In the above description, controlling the passenger protecting apparatus according to the passenger behavior information and/or passenger collision mode is explained, however, the various embodiments of the present disclosure are not limited thereto. For example, the processor 120 may control operation of other components provided in the vehicle according to the passenger behavior information and/or passenger collision mode.

FIG. 6 is a flowchart for controlling a passenger protecting apparatus in a vehicle by estimating passenger behavior information according to various embodiments of the exemplary embodiment of the present disclosure. In the following embodiment, each operation may be sequentially performed, but is not necessarily performed sequentially. For example, the order of each operation may be changed, and at least two operations may be performed in parallel. Furthermore, the following operations may be performed by the processor 120 and/or at least one other component (e.g.: sensor unit 110) provided in the vehicle 100, or may be embodied in instructions executable by the processor 120 and/or at least one other component (e.g., sensor unit 110).

Referring to FIG. 6, the vehicle 100 may obtain the passenger information from a step 610. According to the exemplary embodiment of the present disclosure, the vehicle 100 may obtain the passenger information through a first sensor (e.g.: passenger information obtaining sensor 114 in FIG. 1) provided in the vehicle. The passenger information may include the state information on a seat where a passenger is accommodated in the vehicle and the constraint information on the passenger. The state information on a seat where a passenger is accommodated in the vehicle may include at least one of, for example, a recline angle of a seat (or the tilt of the seat), a swivel angle of a seat (or the rotational state of the seat), a sliding position of a seat (position of the seat), a lateral distance between a seat and a dashboard, a lateral distance between a seat and another seat, and a lateral distance between a seat and a door. The constraint information on the passenger may include, for example, whether a passenger is wearing a belt. According to the exemplary embodiment of the present disclosure, the passenger information may be obtained periodically or continuously, or may be obtained upon detection of a designated event. The designated event may include at least one of an event in which a collision between the vehicle 100 and another object is predicted, an event in which a predicted time of a collision comes, and an event in which a collision is detected.

In a step of 620, the vehicle 100 may update parameters of the passenger behavior model. According to the exemplary embodiment of the present disclosure, the vehicle 100 may update the parameters of the model used for estimation of passenger behavior based on the passenger information. For example, the vehicle 100 may update the passenger parameters of the multi-mass-points model of the passenger behavior 234 based on the passenger information as shown in FIG. 2. The passenger parameters may include at least one of a rotational motion coefficient of a pitch and/or roll of a head and/or chest, and a linear motion coefficient of a lower body.

In a step 630, the vehicle 100 may obtain the passenger behavior information using the vehicle motion information and passenger information based on the passenger behavior model. According to the exemplary embodiment of the present disclosure, the vehicle 100 may obtain the vehicle motion information at an initial stage of a collision, from a second sensor provided in the vehicle (e.g.: vehicle information obtaining sensor 112 of FIG. 1). For example, the vehicle 100 may obtain information on acceleration and angular velocity applied to the vehicle at the initial stage when a collision is detected. According to the exemplary embodiment of the present disclosure, the vehicle 100 may obtain the passenger behavior information through the passenger information model that utilizes the passenger information and the vehicle motion information as input variables. At the instant time, the passenger information model may be the one to which the passenger parameters updated in the step of 620 are applied. The passenger behavior information may include the state information on the rotational motion and/or linear motion of specified mass points (e.g.: head, chest, lower body) among a plurality of mass points in a passenger's body part. For example, the passenger behavior information may include state information on rotational motion of a head, state information on rotational motion of a chest and state information on linear motion of a lower body (e.g.: hip). The state information on the rotational motion of a head may include at least one of a pitch angle of a head, a pitch rate of a head, a roll angle of a head, and a roll rate of a head. The state information on the rotational motion of a chest may include at least one of a pitch angle of a chest, a pitch rate of a chest, a roll angle of a chest, and a roll rate of a chest. The state information on the linear motion of a lower body may include the movement amount of a lower body in a longitudinal direction thereof.

In a step of 640, the vehicle 100 may determine the passenger collision mode based on the passenger behavior information. The passenger collision mode may include at least one of the pitch behavior exaggeration mode, the roll behavior exaggeration mode, and the submarine mode. A detailed operation of determining the passenger collision mode will be provided with reference to FIG. 7 below.

In a step of 650, the vehicle 100 may control the passenger protecting apparatus based on the passenger collision mode. According to the exemplary embodiment of the present disclosure, the vehicle 100 may determine at least one passenger protecting apparatus to operate according to the passenger collision mode and may operate the at least one determined passenger protecting apparatus.

Figure 7:
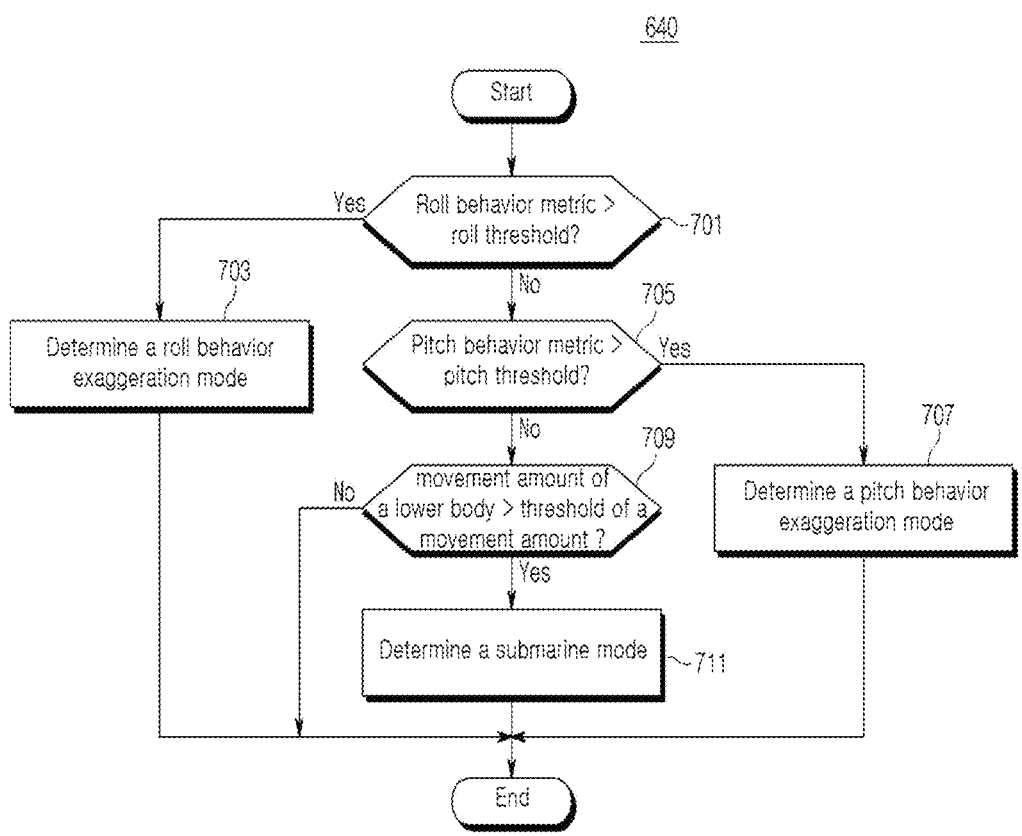
FIG. 7 is a flowchart for determining a passenger collision mode in a vehicle according to various embodiments of the exemplary embodiment of the present disclosure.

FIG. 7 is a flowchart for determining a passenger collision mode in a vehicle according to various embodiments of the exemplary embodiment of the present disclosure. Operations of FIG. 7 may be detailed operation of the step 640 in FIG. 6. In the following embodiment, each operation may be sequentially performed, but is not necessarily performed sequentially. For example, the order of each operation may be changed, and at least two operations may be performed in parallel. Furthermore, the following operations may be performed by the processor 120 and/or at least one other component (e.g.: sensor unit 110) provided in the vehicle 100, or may be embodied in instructions executable by the processor 120 and/or at least one other component (e.g., sensor unit 110).

Referring to FIG. 7, in a step of 701, the vehicle 100 may check whether a roll behavior metric is greater than a predetermined roll threshold or not, by comparing the roll behavior metric and the predetermined roll threshold. For example, the vehicle 100 may check metrics related to roll behaviors in the passenger behavior information, and compare at least one metric selected among the metrics related to the roll behavior with the predetermined roll threshold. The metrics related to the roll behavior, for example, may be a roll angle of a head, a roll rate of a head, a roll angle of a chest, and a roll rate of a chest. According to the exemplary embodiment of the present disclosure, the roll threshold may include thresholds for each metric related to the roll behavior. For example, the roll threshold may include at least one threshold selected among a threshold of a roll angle of a head, a threshold of a roll rate of a head, a threshold of a roll angle of a chest, and a threshold of a roll rate of a chest.

When the roll behavior metric is greater than the roll threshold, the vehicle 100 may determine the roll behavior exaggeration mode as the passenger collision mode in a step of 703.

When the roll behavior metric is equal to or less than the roll threshold, the vehicle 100 may check whether a pitch behavior metric is greater than a predetermined pitch threshold or not, by comparing the pitch behavior metric with the predetermined pitch threshold in a step of 705. For example, the vehicle 100 may check metrics related to the pitch behavior in the passenger behavior information, and may compare at one selected among metrics related to the pitch behavior with the predetermined pitch threshold. The metrics related to the pitch behavior, for example, may be a pitch angle of a head, a pitch rate of a head, a pitch angle of a chest, and a pitch rate of a chest. According to the exemplary embodiment of the present disclosure, the pitch threshold may include thresholds for each metric related to the pitch behavior. For example, the pitch threshold may include at least one selected among a threshold of a pitch angle of a head, a threshold of a pitch rate of a head, a threshold of a pitch angle of a chest, and a threshold of a pitch rate of a chest.

When the pitch behavior metric is greater than the pitch threshold, the vehicle 100 may determine the pitch behavior exaggeration mode as the passenger collision mode in a step of 707.

When the pitch behavior metric is equal to or less than the pitch threshold, the vehicle 100 may check whether the movement amount of a lower body is greater than a predetermined threshold of a movement amount or not, by comparing the movement amount of a lower body and the threshold of a movement amount in a step of 709. For example, the vehicle 100 may check the movement amount of a lower body which is a metric related to a linear behavior of a lower body in the passenger behavior information, and compare the movement amount of a lower body with the predetermined threshold of a movement amount of the specified mass point.

When the movement amount of a lower body is greater than the predetermined threshold of a movement amount, the vehicle 100 may determine the submarine mode as the passenger collision mode in a step of 711.

When the movement amount of a lower body is equal to or less than the predetermined threshold of a movement amount, the vehicle 100 may determine that the passenger collision mode does not fall into the roll behavior exaggeration mode, the pitch behavior exaggeration mode, and the submarine mode, and may terminate the operation for determining the passenger collision mode.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle for protecting a passenger of the vehicle, the vehicle including:
   a plurality of passenger protecting apparatuses;
   first sensors configured to obtain passenger information related to the passenger of the vehicle;
   second sensors configured to obtain vehicle motion information in a situation of a collision of the vehicle with another object; and
   a processor operatively connected to the passenger protecting apparatuses, the first sensors and the second sensors,
   wherein the processor configured to:
      estimate passenger behavior information in the situation of the collision based on the obtained passenger information and the obtained vehicle motion information, and
      control operation of at least one of the plurality of passenger protecting apparatuses based on the estimated passenger behavior information, and
   wherein the passenger information includes at least one of state information on a seat of the passenger and information on whether the passenger is wearing a belt.

2. The vehicle of claim 1, wherein the state information on the seat of the passenger includes at least one of a recline angle of the seat, a swivel angle of the seat, a sliding position of the seat, a longitudinal distance between the seat and a dashboard, a lateral distance between the seat and another seat, and a lateral distance between the seat and a door of the vehicle.

3. The vehicle of claim 1, wherein the vehicle motion information includes at least one of a yaw rate, a pitch rate, and a roll rate and acceleration applied to the vehicle in the situation of the collision.

4. The vehicle of claim 1,
   wherein the processor is further configured to:
      update a passenger parameter of a passenger behavior model based on the obtained passenger information,
      estimate the passenger behavior information in the situation of the collision by inputting the obtained passenger information and the obtained vehicle motion information into the passenger behavior model of which the passenger parameter is updated, and
   wherein the passenger parameter includes at least one of a pitch rotational motion coefficient of a specified mass point, a roll rotational motion coefficient of the specified mass point, and a linear motion coefficient of the specified mass point.

5. The vehicle of claim 4, wherein the specified mass point includes at least one of a head, a chest, and a lower body of the passenger.

6. The vehicle of claim 5,
   wherein the passenger behavior information includes at least one of state information on a rotational motion of the specified mass point, and state information on a linear motion of the specified mass point,
   wherein the state information on the rotational motion includes at least one of a pitch angle, a pitch rate, a roll angle, and a roll rate of the specified mass point, and
   wherein the state information on the linear motion includes a movement amount of the specified mass point.

7. The vehicle of claim 6, wherein the processor is further configured to:
   determine a passenger collision mode based on the estimated passenger behavior information;
   determine at least one passenger protecting apparatus to operate among the plurality of passenger protecting apparatuses based on the determined passenger collision mode; and
   control the determined at least one passenger protecting apparatus to operate; and wherein the passenger collision mode includes at least one of a roll behavior exaggeration mode, a pitch behavior exaggeration mode, and a submarine mode.

8. The vehicle of claim 7, wherein the processor is further configured to:
   determine the roll behavior exaggeration mode as the passenger collision mode, when at least one of the roll angle and the roll rate of the specified mass point is greater than a predetermined roll threshold, and
   determine the pitch behavior exaggeration mode as the passenger collision mode, when at least one of the pitch angle and the pitch rate of the specified mass point is greater than a predetermined pitch threshold, and
   determine the submarine mode as the passenger collision mode, when the movement amount of the specified mass point is greater than a predetermined threshold.

9. The vehicle of claim 4, wherein the passenger parameter is updated based on a lookup table representing standard male and female rotational motion coefficients per seat condition.

10. The vehicle of claim 9, wherein the processor is further configured to:
    check at least one rotational motion coefficient corresponding to the state information on the seat of the passenger in the lookup table, and
    obtain the passenger parameter updated by applying a correction coefficient, according to whether the passenger is wearing the belt, to the at least one rotational motion coefficient.

11. A method for operating a vehicle for protecting a passenger of the vehicle, the method comprising:
    obtaining passenger information related to the passenger in the vehicle;
    obtaining vehicle motion information in a situation of a collision of the vehicle with another object;
    estimating, by a processor, passenger behavior information in the situation of the collision based on the obtained passenger information and the obtained vehicle motion information; and
    controlling, by the processor, operation of at least one of the plurality of passenger protecting apparatuses provided in the vehicle based on the estimated passenger behavior information,
    wherein the passenger information includes at least one of state information on a seat of the passenger and information on whether the passenger is wearing a belt.

12. The method of claim 11, wherein the state information on the seat of the passenger includes at least one of a recline angle of the seat, a swivel angle of the seat, a sliding position of the seat, a longitudinal distance between the seat and a dashboard, a lateral distance between the seat and another seat, and a lateral distance between the seat and a door of the vehicle.

13. The method of claim 11, wherein the vehicle motion information includes at least one of a yaw rate, a pitch rate, and a roll rate and acceleration applied to the vehicle in the situation of the collision.

14. The method of claim 11, wherein the estimating of the passenger behavior information in the situation of the collision includes:
    updating a passenger parameter of a passenger behavior model based on the obtained passenger information; and
    estimating a passenger behavior information in the situation of the collision by inputting the obtained passenger information and the obtained vehicle motion information into the passenger behavior model of which the passenger parameter is updated,
    wherein the passenger parameter includes at least one of a pitch rotational motion coefficient of a specified mass point, a roll rotation coefficient of the specified mass point, and a linear motion coefficient of the specified mass point.

15. The method of claim 14, wherein the specified mass point includes at least one of a head, a chest, and a lower body of the passenger.

16. The method of claim 15, wherein the passenger behavior information includes at least one of state information on a rotational motion of the specified mass point, and state information on a linear motion of the specified mass point,
    wherein the state information on the rotational motion includes at least one of a pitch angle, a pitch rate, a roll angle, and a roll rate of the specified mass point, and
    wherein the state information on the linear motion includes a movement amount of the specified mass point.

17. The method of claim 16, wherein the controlling of the operation of the at least one of the plurality of passenger protecting apparatuses includes:
    determining a passenger collision mode based on the passenger behavior information;
    determining at least one passenger protecting apparatus to operate among the plurality of passenger protecting apparatuses based on the determined passenger collision mode; and
    controlling the determined at least one passenger protecting apparatus to operate,
    wherein the passenger collision mode includes at least one of a roll behavior exaggeration mode, a pitch behavior exaggeration mode, and a submarine mode.

18. The method of claim 17, wherein the determining the passenger collision mode includes:
    determining the roll behavior exaggeration mode as the passenger collision mode when at least one of a roll angle or a roll rate of the specified mass point is greater than a predetermined roll threshold;
    determining the pitch behavior exaggeration mode as the passenger collision mode when at least one of a pitch angle or a pitch rate of the specified mass point is greater than a predetermined pitch threshold; and
    determining the submarine mode as the passenger collision mode when a movement amount of the specified mass point is greater than a predetermined movement amount threshold.

19. The method of claim 14, wherein the passenger parameter is updated based on a lookup table representing standard male and female rotational motion coefficients per seat condition.

20. The method of claim 19, wherein the updating the passenger parameter of the passenger behavior model includes:
    checking at least one rotational motion coefficient corresponding to the state information on the seat of the passenger in the lookup table, and
    obtaining the passenger parameter updated by applying a correction coefficient according to whether the passenger is wearing the belt, to the at least one rotational motion coefficient.

* * * * *